Feb. 11, 1936.                R. RIEGLER                2,030,800
                    METHOD OF VAPOR PHASE OXIDATION
                        Filed March 28, 1929
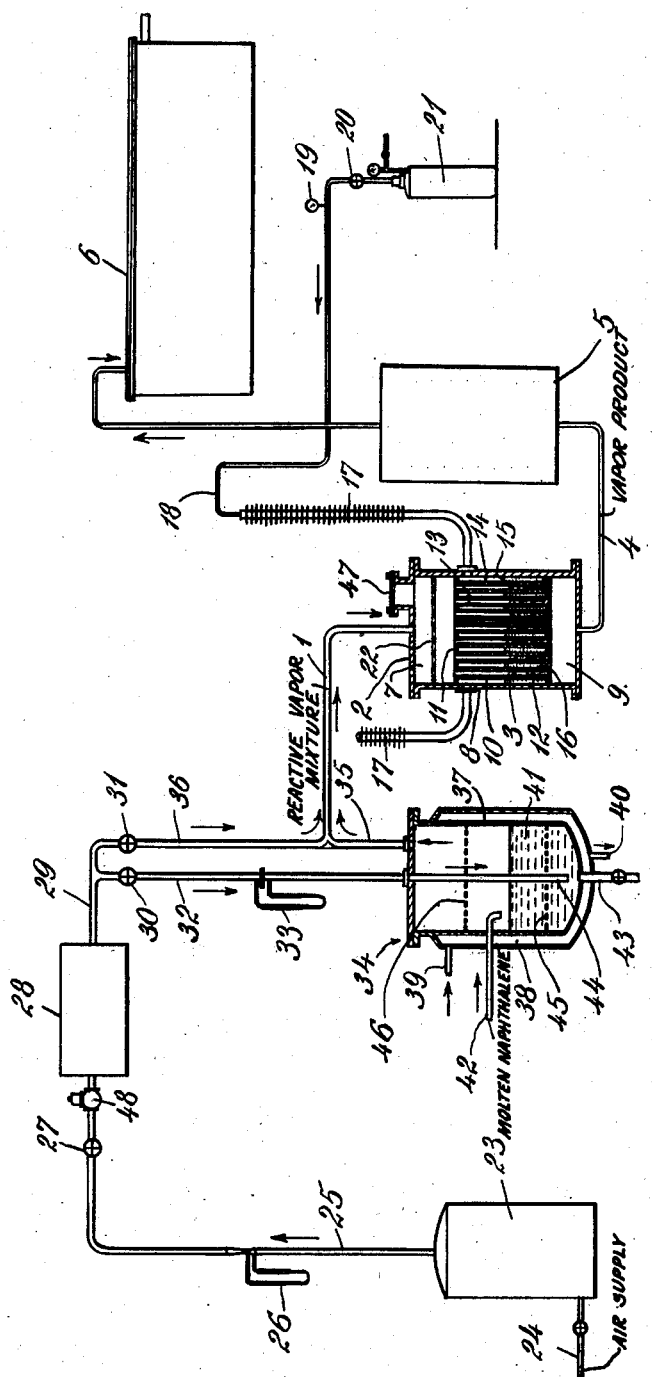
INVENTOR
Riewen Riegler
BY
Pennie, Davis, Marvin & Edmonds
His ATTORNEYS Patented Feb. 11, 1936

2,030,800

UNITED STATES PATENT OFFICE 2,030,800

METHOD OF VAPOR PHASE OXIDATION

Riewen Riegler, Buffalo, N. Y., assignor to National Aniline & Chemical Co., Inc., New York, N. Y., a corporation of New York Application March 28, 1929, Serial No. 350,524

7 Claims. (Cl. 260—123)

This invention relates to an improved method of carrying on chemical reactions in the gas or vapor state or phase, and especially reactions which take place only in the presence of a catalytic agent, and which are hence called catalytic reactions. The invention is directed especially to the gas phase partial oxidation of organic compounds, such, for example, as the oxidation of naphthalene to phthalic anhydride, the oxidation of benzene to maleic acid, of toluene to benzaldehyde and benzoic acid, of anthracene to anthraquinone and of methyl and ethyl alcohols to formaldehyde and acetaldehyde.

All chemical reactions may be classed either as exothermic reactions, those in which the reaction is accompanied by the generation of heat, or as endothermic reactions those in which the reaction is accompanied by the absorption of heat. In either case it is usually important to maintain the temperature of the reacting gases or vapors relatively constant because a substantial variation in temperature is apt to vary the character of the reaction so as to produce a different product, or so as to impair the purity of the product which it is desired to obtain. Thus, for example, in the manufacture of phthalic anhydride by the gas phase, partial oxidation of naphthalene, the reaction takes place in a temperature range from about 350° C. to about 550° C., and if the temperature of the reacting gases or vapors is allowed to fall substantially below this range the oxidation is liable to be incomplete so that some unoxidized naphthalene will pass the zone of reaction and contaminate the product. Also if the temperature is allowed to exceed this figure by a substantial amount, the oxidation may be carried beyond the desired point and a large part of the naphthalene will be lost due to complete oxidation of the naphthalene to carbon dioxide and water.

In such a reaction enormous quantities of heat are generated which must be removed from the zone of reaction as fast as produced in order to prevent a rise in temperature that would carry the oxidation beyond the desired point. Exothermic catalytic reactions of this kind are carried out in an apparatus known as a converter. Various types of converters have been used, the catalyst being placed upon shelves, trays, or in tubes and the heat being removed by the circulation of a cooling fluid. A form of converter which has proven very satisfactory in operation, however, consists of a reaction chamber, or catalyzer chamber, containing the catalyst, and a container for a liquid which boils at approximately the temperature at which the reaction takes place, this chamber and container being arranged in the best possible heat exchanging relation with one another and heat generated by the chemical reaction being removed as latent heat of vaporization of the liquid.

One arrangement of apparatus for carrying on the oxidation of organic compounds is shown in the accompanying drawing wherein the single figure shows some of the apparatus in elevation and some in vertical section, together with the piping connections.

In order to carry on oxidation reactions such as those above mentioned, it is necessary first to produce a reactive vapor mixture of the organic compound and air, oxygen, ozone, or other oxygen containing gas. The manner of producing this reactive vapor mixture with which, among other things, the invention is concerned, will be presently described, after the general construction and operation of the apparatus is touched upon.

Referring to the accompanying drawing, the reactive vapor mixture is conveyed through the pipe 1 by which it is delivered to the converter 2, in which it is brought, at the proper temperature, into contact with a catalyst 3 causing the desired oxidation to take place. The products of the reaction, still in the vapor state, are led from the converter at the bottom by a conduit 4 to a vapor cooler 5 and then to a condenser 6.

The converter 2 comprises a metal cylinder closed at each end by suitable plates, and divided into three compartments, namely an upper compartment 7, a reaction section 8, and a lower compartment 9. The reaction section 8 is preferably built up of a relatively large number of tubes 10, which are preferably square in cross section and held in slightly spaced relation by a tube-sheet or by metal spacers, the tubes being welded to the metal spacers and to each other at the top and bottom in slightly spaced relation to one another or to the tube sheet to form a tube-bundle or tube-nest.

The tube sheet or the metal which is filled in by welding at the upper and lower ends of the tubes to maintain them in spaced relation forms with the tubes an upper drum 11 extending across the top of the tube bundle. A lower drum 12 is similarly formed across the bottom of the bundle. The tube bundle or nest is secured within the metal cylinder by welding the drums 11 and 12 to its interior walls. The tubes 10 are open at their upper and lower ends for the passage of the reactive vapor mixture through their interiors which constitute the reaction or catalyzer chambers 13.

The space between the tubes constitutes a liquid container 14 and is filled with a suitable temperature controlling liquid, such as the mercury 15, up to the level indicated on the drawing. Instead of mercury, molten sulfur, diphenyl diphenyloxide and other substances which have boiling points corresponding approximately to the temperature of the reaction may be used. The catalyst 3, for example, vanadium oxide distributed upon a suitable carrier, such for example as alundum or "grained" aluminum, is placed in the tubes 10, and in order to support the catalyst in this position a perforated plate 16 extends across the lower end of the bundle of tubes. The catalyst does not extend to the top of the tubes 10, and neither does the mercury completely fill the container 14 for reasons which will shortly appear.

Leading out of the upper part of the container 14 there are a plurality of condensers 17 by which any mercury vapor entering them is condensed and returned to the body of mercury 15. These condensers may be cooled by air, water, or any other convenient cooling fluid. As shown in the drawing, they are provided with fins for air cooling. Connected to the upper end of these condensers 17 there is a pipe 18 which leads to a source of gaseous pressure that is preferably maintained at a higher pressure than that which it is desired to hold within the container 14.

Pipe 18 is provided with a gauge 19 by means of which the pressure upon the boiling mercury 15 may be observed, and also with a reducing valve 20 by which the pressure upon the mercury may be maintained. It is desirable to supply the pressure upon the boiling mercury by means of an inert gas, and this may be conveniently obtained from a cylinder 21 containing, for example, nitrogen or carbon dioxide under pressure.

In operating that part of the apparatus thus far described, the mercury 15 is brought to the boiling condition by the application of extraneous heat in any suitable manner (not shown). The pressure on the boiling mercury is maintained at such a value that the catalyst in tubes 10 is maintained at the desired temperature.

A current of a reactive vapor mixture enters the converter through the pipe 1, and is broken up in any suitable way, for example, by means of a perforated distributing plate 22 in the upper compartment 7, and the reactive vapor mixture thereby is distributed uniformly over the top of the tube nest. The vapors pass down through the interiors of tubes 10 and in the upper portions of the tubes are brought in heat exchanging relation with the mercury vapor in the container 14. This heat exchange has a two-fold beneficial effect. It raises the reactive vapor to the desired reaction temperature, and it condenses some of the vaporized mercury.

As the reactive vapor mixture continues down the tubes through the catalytic material 3, the desired partial oxidation takes place and the oxidized vapor passes to the lower compartment 9 and flows into the conduit 4. The reaction is exothermic and a very considerable amount of heat is given off as the chemical change takes place. Heat is thus imparted to the catalyst and to the interior walls of the tubes 10 by which it is conducted to the mercury 15, thus causing the vaporization or boiling to increase. The source of extraneous heat is cut off as soon as the flow of reactive vapor through the converter commences.

The present invention concerns the preparation of the mixture of reactive gases or vapors for delivery to the converter above referred to and this feature has its most important application where one of the reagents is normally solid and has to be vaporized in order to carry out the reaction in the vapor phase. Prior to the present invention, the reagent for example, naphthalene, was melted and maintained in molten condition in a vessel suitable for the purpose, and the total quantity of air required for the oxidation reaction in the converter was bubbled through the molten mass by delivering the air through a pipe which terminated below the surface of the liquid reagent. The vapor resulting from this procedure passed out of the vessel near the top and was led to the converter.

There were many difficulties with this method of producing the reactive vapor mixture. The reactive vapor mixtures made in this manner were very apt to be of a highly explosive nature which would and did produce explosions in the converter or some of its connections of sufficient violence to do considerable damage. Such explosions, of course, interrupted the operation of the apparatus and made it necessary to shut down to make repairs. It was found, however, that explosive mixtures were produced only when the reactive vapor mixture contained certain proportions of oxygen-containing gas to organic compound.

It was found that when the reactive vapor mixture contained a relatively small proportion of oxygen-containing gas a comparatively safe non-explosive mixture was produced; likewise when the reactive vapor mixture contained relatively large amounts of the oxygen-containing gas. But there was a certain range of ratios which had to be avoided in order to prevent explosions, and with the above-mentioned method of making the reactive vapor mixture, it was extremely difficult and oftentimes impossible to keep away from the explosive range.

This former method of controlling the ratio was extremely cumbersome and it was very difficult to regulate the operation of the vaporizer to suit the operating conditions of the converter. If it was desired to change the velocity of the reactive vapor in the converter tubes, for example, in order to change the time of contact with the catalyst, the rate of vaporization also had to be changed at the same time by increasing or decreasing the amount of air bubbled through the melted organic compound. Hence it was impossible to change the velocity without also changing the ratio, and temperature of the organic compound in the vaporizer.

Moreover, with the former method of control, when the reactive vapor mixture was passed into the converter at a high rate, or when the use of a high ratio of oxygen-containing gas to organic compound was attempted, the large amount of gas passing through the melted organic compound was very apt to produce foaming in the vaporizer. This caused liquid particles of the compound to be carried over into the converter, which being at a high temperature was apt to ignite the organic compound, e. g. naphthalene. The large amount of oxygen-containing gas being supplied produced a hot fire sometimes heating the top of the converter to red heat, weakening the structure to a point where replacement was necessary. This also carbonized the catalyst in the converter tubes necessitating changing the catalyst, and caused fusion of the aluminum carrier when used. The only way of avoiding this foaming was to use a vaporizer of extraordinarily large size.

The principal object of the present invention is to provide a method of feeding the reactive vapor mixture to the converter by which the danger of supplying an explosive mixture to the converter is avoided.

Another object of the invention is to provide for control of vapor concentration independently of the reactive vapor volume.

Another object of the invention is to provide a ready and accurate method of controlling the ratio of oxygen-containing gas to organic compound fed to the converter.

A further object of the invention is to provide a method for operating the vaporizer in such a way that foaming and consequent danger of injuring the converter or catalyst is prevented.

In carrying out the present invention, the oxygen-containing gas such as air is passed through the organic compound in the liquid state, the organic compound being heated to liquefy it, if that is necessary. The liquid organic compound is maintained at a known temperature and the oxygen-containing gas is passed through it at a known temperature and rate. In order to assist in maintaining the temperature of the liquid organic compound, the gas is preheated to about the same temperature as that of the organic compound. The ratio of oxygen-containing gas to organic compound in the vapor thus produced, is consequently known with certainty. The rate and velocity at which the oxygen-containing gas is passed through the organic compound is preferably, though not necessarily, regulated to produce a saturated vapor.

In accordance with the present invention, instead of passing through the liquid organic compound all of the oxygen-containing gas required in the reactive vapor mixture for the desired operation of the converter, only a portion of this gas is passed through it. A vapor richer in the organic compound than desired to employ in the converter is first made in the manner thus described, the ratio of oxygen-containing gas to organic compound in this vapor being accurately known, and then this vapor is diluted with a known amount of oxygen-containing gas to produce a non-explosive reactive vapor mixture, and this mixture is then passed into the converter.

By means of this procedure, it is entirely practicable to operate the converter at ratios quite close to and preferably above the explosive range. This can be done with safety because of the accurate and positive control over the ratio. This, moreover, is highly important from the standpoint of economical converter operation as has already been pointed out. By this method a positive control over the ratio is provided instead of being subject to the whims of many variables. It is always known with exactness just what the ratio is and the ratio can be changed in the right direction with certainty in case anything goes wrong with the operation of the converter, such for example as unoxidized organic compound passing over into the condenser.

It is desirable to heat the diluted gas to a point where it will not cool the reactive vapor mixture sufficient to cause condensation of the organic compound in the mixture, and the diluted gas is preferably heated approximately to the temperature of the undiluted vapor. Such condensation can be prevented, however, by imparting heat to the reactive vapor mixture on its way to the converter.

My invention will be better understood from the following description of carrying out the invention in connection with a particular reaction, namely, the partial oxidation of naphthalene to phthalic anhydride.

The oxygen-containing gas in this case is air, although other gases may be used as above mentioned. The air is supplied to an air receiver 23 through a valved pipe 24 from a suitable compressor (not shown). The air passes from the receiver 23 through line 25, then through an air meter 26 by which the rate of flow of the air is measured, through a valve 27 and into the air preheater 28. Leaving preheater 28 the heated air passes through line 29 to two valves 30 and 31. Valve 30 admits air to the line 32 in which is placed an orifice meter 33 or other suitable air measuring device, and this line conveys the heated air to vaporizer 34.

The naphthalene vapor is delivered from the vaporizer by pipe 35 to pipe 1 and is diluted by air supplied to pipe 1 by line 36 under the control of valve 31. The amount of dilution air may be measured by a meter (not shown) placed in line 36 similar to the orifice meter 33, or by taking the difference between the reading of air meter 26 and orifice meter 33. The ratio of air to naphthalene in the reactive vapor mixture passing into the converter through line 1 is controlled by regulating valves 30 and 31.

The vaporizer 34 comprises a closed vessel 37 for holding the naphthalene, surrounded at the sides and bottom by a steam jacket 38 to which steam at a definite controlled temperature or pressure is supplied by pipe 39 and from which the condensed steam is drained away through pipe 40. A body of naphthalene 41 is maintained in vessel 37 at about the level indicated in the drawing, the naphthalene being most conveniently introduced into vessel 37 in molten condition by means of a pipe 42. A valved pipe 43 drains the lowermost point of the naphthalene-containing vessel 37 through which the higher boiling impurities which may be present in the naphthalene may be removed. This permits the use of crude naphthalene, the purification thereof taking place in the vaporizer.

Air supplied to the vaporizer 34 by means of line 32 is received by the vaporizer tube 44, the lower end of which terminates close to the bottom of vessel 37 so that the air is discharged into the molten body of naphthalene 41 near the bottom thereof. This stream of air mixing with the molten naphthalene is broken up into numerous small streams or bubbles by means of a perforated plate 45 which is placed horizontally across the vessel 37 somewhat above the lower end of vaporizer tube 44. The naphthalene vaporizes and mixes with the bubbles of air as they rise through the body of molten naphthalene, and the naphthalene vapor passing through the separating baffle 46 collects in the upper part of the vaporizer and passes out at the top through pipe 35.

The amount of naphthalene vaporized in a given time depends upon the temperature of the body of naphthalene, the temperature of the air entering through line 32, the velocity of the air stream and the volume of air. At a given temperature, naphthalene will vaporize at a definite rate until the air in contact with the naphthalene becomes saturated. If the vapor is removed the naphthalene will continue to vaporize. If the air into which it vaporizes is removed at a rate less than the vaporization rate of the naphthalene, the air will be saturated with naphthalene vapor, and if the air is removed at a greater rate, it will not be saturated.

In order to control the naphthalene content of the vapor and air mixture in the vaporizer, which has hereinbefore been referred to simply as vapor, to distinguish it from the reactive vapor mixture produced after the mixing therewith of the dilution air, the amount of naphthalene in the vapor must be known. The naphthalene content of the vapor is most conveniently obtained by so running the vaporizer that the air stream is saturated at a definite temperature. Then by measuring the temperature, the amount of naphthalene in the vapor is then accurately known, and can be checked by weighing the naphthalene introduced into the vaporizer.

The rate at which the naphthalene must be vaporized is determined by the size of the converter. The temperature of the molten naphthalene is regulated by varying the quantity and/or temperature of the steam admitted to the jacket 38 and the naphthalene is maintained at such a temperature that it preferably saturates the amount of air passing through the vaporizer, which is measured by the orifice meter 33. This amount of air is limited by the capacity of the vaporizer and by theoretical considerations of maximum desired velocity of the air in bubbling through the molten naphthalene.

These factors determine the most desirable operating conditions for the vaporizer and the most desirable vaporizing temperature. The temperature at which the vaporizer is operated therefore will vary for different vaporizers but with a particular vaporizer which I have operated, I have found the most desirable vaporization temperature for naphthalene to be between about 110 and 120° C.

It is of course desirable that no unoxidized naphthalene vapor pass through the converter and therefore it is desirable that the temperature of the reactive vapor mixture be at the desired reaction temperature by the time it reaches the catalyst. The heating of the reactive vapor mixture to the desired reaction temperature usually takes place very largely within the upper empty portions of the converter tubes 10 and in the upper chamber 7.

Most of the pipe connections shown on the drawing are preferably provided with suitable lagging and/or steam jacketing to prevent loss of heat or to prevent undesired changes in temperature between different pieces of apparatus. Pipe 35 and pipe 1 by which the reactive vapor mixture is conducted from the vaporizer to the converter are preferably provided with a steam jacket (not shown) to maintain the temperature of the reactive vapor mixture above the dew point and prevent separation.

The pressure in air receiver 23 is maintained sufficiently high to force the air through the body of molten naphthalene and cause a flow of the reactive vapor mixture through the converter at the highest desired velocity. In this connection it is to be noted that the granular mass of catalyst in each of the tubes offers resistance to the flow of the reactive vapor since this vapor in passing through the granules must take circuitous paths following the interstices between the granules.

The converter is provided with a safety device comprising a diaphragm 47 mounted in an outlet from the upper compartment 7 and designed to give way and release the pressure within the converter in case the pressure should rise to an undesired amount. Such a diaphragm is referred to as an explosion flange and may conveniently be made of aluminum foil or asbestos. Should this diaphragm 47 blow out during the operation of the converter, it would cause a sudden drop in the pressure within the chamber 7 thus permitting a sudden increase in the flow of air through the vaporizer and the supply connections for the naphthalene vapor. The increase in the flow of air through the vaporizer is apt to be so great as to far exceed the normal capacity of the vaporizer and cause large amounts of liquid naphthalene to be carried up into the vapor connection pipe 1 and into the converter. The presence of unvaporized naphthalene in the converter in quantity is dangerous as above explained, particularly when a large quantity of air is being delivered along with it because the naphthalene is apt to become ignited and burn with such violence as to heat the converter even to red heat.

In order to prevent this, I place a stop check valve 48 in the air supply line 25. This valve is so constructed that it remains open as long as the quantity of air passing through it does not exceed a predetermined amount but as soon as the volume of air exceeds this amount, the valve closes automatically. The valve may be of such construction that when it is once tripped it remains closed until reopened manually or it may be so constructed that it will reopen after the flow of air has decreased below the predetermined value at which the valve is set to operate. With either construction, in case the explosion flange or diaphragm 47 blows out for any cause, stop check valve 48 immediately operates and either cuts off the supply of air altogether, or keeps it from exceeding a maximum predetermined rate which is insufficient to cause damage.

The stop check valve 48 is preferably placed in line 25 which is ahead of the air preheater 28, but it can of course be placed in other locations, for example, it could be placed in pipe 29, or in pipe 1, or stop check valves of either the same or different settings as desired, could be placed in pipes 32 and 36.

It was mentioned above that when the converter 2 has been charged with fresh catalyst the catalyst at first is very active at temperatures only slightly above the boiling point of mercury at atmospheric pressure. At the start of a run, therefore, the pressure on the mercury vapor is maintained approximately at this value, and the reacted vapor issues from the bottom chamber 9 of the converter at a temperature in the neighborhood of 275° C. to 450° C. After the converter has been in operation for from 3 to 6 months or more, however, the activity of the catalyst begins to depreciate and consequently the output of the converter is reduced.

In order to bring up the rate of production of phthalic anhydride, the pressure on the mercury vapor is increased by means of valve 20 thus increasing the temperature of the catalyst. By increasing the temperature of the catalyst in this manner, its activity is increased and the output of the converter is brought back approximately to the original value. This increase in temperature of the catalyst, however, also increases the temperature of the reacted vapor.

The converter is operated at this increased temperature for another period and then its operating temperature is again increased. The pressure is thus periodically increased until the pressure on the mercury vapor reaches the neighborhood of 70 lbs. above atmospheric pressure, which, for reasons of mechanical design is considered to be about the maximum safe operating pressure for the converter.

The function of the vapor cooler 5 is to cool the exit gases from the converter before entering the condenser, to a temperature slightly above the dew point of the reacted vapors, which for phthalic anhydride is about 130 to 132° C.

Investigation has shown that the ratio of air to naphthalene vapor in the reactive vapor mixture delivered to the converter may be varied within extremely wide limits. Thus, for example, I have successfully used a reactive vapor mixture containing as high as 30 pounds of air to 1 pound of naphthalene vapor. Investigation has also shown, however, that there is a certain range of ratios which produces reactive vapor mixtures that are highly explosive in character and which are for this reason dangerous to pass into the converter. This explosive range includes all ratios from about 5 or 6 pounds of air to 1 of naphthalene to about 22 or 23 pounds of air to 1 of naphthalene. Ratios either below or above this range are non-explosive.

It has also been shown by investigation that the higher the ratio of air to naphthalene, the purer is the phthalic anhydride product generally obtained. In other words, the purest phthalic anhydride is obtained when the reactive mixture entering the converter is composed of from 23 or more lbs. of air to 1 pound of naphthalene vapor. A phthalic anhydride product of a highly satisfactory grade is obtained by employing ratios close to the upper end of the explosive range, that is to say, above a ratio of 22 or 23 to 1. Considering the factor of economy as well as that of purity, it is therefore desirable to operate at ratios which are close to the explosive range.

As referred to above, the control of the ratio of air to naphthalene is effected in accordance with this invention by maintaining the vaporizer at a known temperature, by regulating valves 30 and 31 noting the readings of meters 26 and 33, and by regulating air preheater 28 so that the air enters the vaporizer at a known temperature. By means of this simple control of the ratio, the explosive range just referred to may be very easily avoided and at the same time the converter may be safely operated at ratios very close to this explosive range.

The concentration of the naphthalene in the reactive vapor mixture is made entirely independent of the volume of mixture passing through the converter. When it is desired to make a change in the ratio it can always be predicted with certainty in which direction and to what extent the ratio will be changed by a given change in setting of valve 31. Hence the danger of feeding to the converter a mixture which will cause an explosion resulting in serious damage is entirely eliminated. Moreover, the greatly reduced volume of air passed to the vaporizer prevents foaming of the naphthalene in the vaporizer and injury to the catalyst which is apt to result therefrom.

It is also an easy matter to change the velocity of the reactive vapor mixture in the converter independently of the concentration of naphthalene in this mixture, whereas by the old practice of passing the total quantity of air through the vaporizer, whenever it was desired to change the velocity, the rate of vaporization was also necessarily changed at the same time, thus varying the temperature as well as the ratio. With the old method also, when operating with ratios above the explosive limit it was substantially impossible to predict how a change in the setting of the valve would affect the ratio and it frequently happened that the ratio fell too low causing an explosion.

I claim:—

1. In the vapor-phase catalytic partial oxidation of an organic compound in which a gaseous reaction mixture containing the organic compound in the vapor phase and free oxygen in a predetermined proportion is passed in contact with a heated catalyst, the improvement in the method of controlling the proportion of organic compound to free oxygen in the gaseous reaction mixture which comprises saturating a gas containing free oxygen with the vapor of said organic compound at a known temperature, and admixing said saturated gas with an amount of gas containing free oxygen adapted to reduce the proportion of organic compound to free oxygen to said predetermined value.

2. The method of forming a vapor mixture containing oxygen and the vapor of a normally solid organic compound in a predetermined ratio for feeding to a converter for partially oxidizing said compound which comprises liquefying a body of said compound by heat and maintaining it at a known temperature, passing a gas containing free oxygen through said body of liquefied organic compound to vaporize the same, regulating the rate of supply of said gas to produce a vapor mixture approximately saturated with said vapor, and admixing said approximately saturated vapor mixture with additional gas containing free oxygen, the amount of said additional gas being adapted to produce a non-explosive vapor mixture containing oxygen and said organic compound in said predetermined ratio.

3. The method of forming a non-explosive mixture of naphthalene vapor and air for feeding to a converter for partially oxidizing the naphthalene to produce phthalic anhydride which comprises passing a current of air through a body of molten naphthalene, regulating the rate of supply of said air to produce a vapor mixture approximately saturated with naphthalene vapor and admixing said approximately saturated vapor mixture with sufficient additional air to produce a non-explosive mixture.

4. In the vapor-phase catalytic partial oxidation of naphthalene in which a gaseous reaction mixture containing naphthalene in the vapor phase and air in a predetermined proportion is formed for passage in contact with a heated catalyst, the improvement in the method of controlling the proportion of naphthalene to air in the gaseous reaction mixture which comprises saturating air with naphthalene vapor at a known temperature, and admixing said saturated air with an amount of air adapted to reduce the proportion of naphthalene to air to said predetermined value.

5. The method of forming a non-explosive mixture of naphthalene vapor and air for feeding to a converter for partially oxidizing the naphthalene in the manufacture of phthalic anhydride which comprises, liquefying naphthalene by heat and maintaining it at a known temperature, heating air substantially to the same temperature, passing said heated air through the liquid naphthalene to vaporize the same, regulating the rate at which the air is passed through the naphthalene so as to produce a vapor mixture which is approximately saturated with naphthalene vapor, and admixing said vapor mixture with additional air previously heated approximately to the temperature of said naphthalene, the amount of said additional air being adapted to produce a non-explosive mixture.

6. In the vapor phase catalytic partial oxidation of an organic compound in which a gaseous reaction mixture containing the organic compound in the vapor phase and free oxygen in a predetermined proportion is passed in contact with a heated catalyst, the improvement in the method of controlling the proportion of organic compound to free oxygen in the gaseous reaction mixture which comprises saturating an innocuous gas with the vapor of said organic compound at a known temperature, and admixing said saturated gas with an amount of gas containing free oxygen adapted to produce a gaseous reaction mixture containing said organic compound and free oxygen in said predetermined proportion.

7. In the vapor phase catalytic partial oxidation of naphthalene in which a gaseous reaction mixture containing naphthalene in the vapor phase and free oxygen in a predetermined proportion is passed in contact with a heated catalyst, the improvement in the method of controlling the proportion of naphthalene to free oxygen in the gaseous reaction mixture which comprises saturating an innocuous gas with the vapor of naphthalene at a known temperature, and admixing said saturated gas with an amount of gas containing free oxygen adapted to produce a gaseous reaction mixture containing naphthalene and free oxygen in said predetermined proportion.

RIEWEN RIEGLER.